United States Patent Office 3,536,615
Patented Oct. 27, 1970

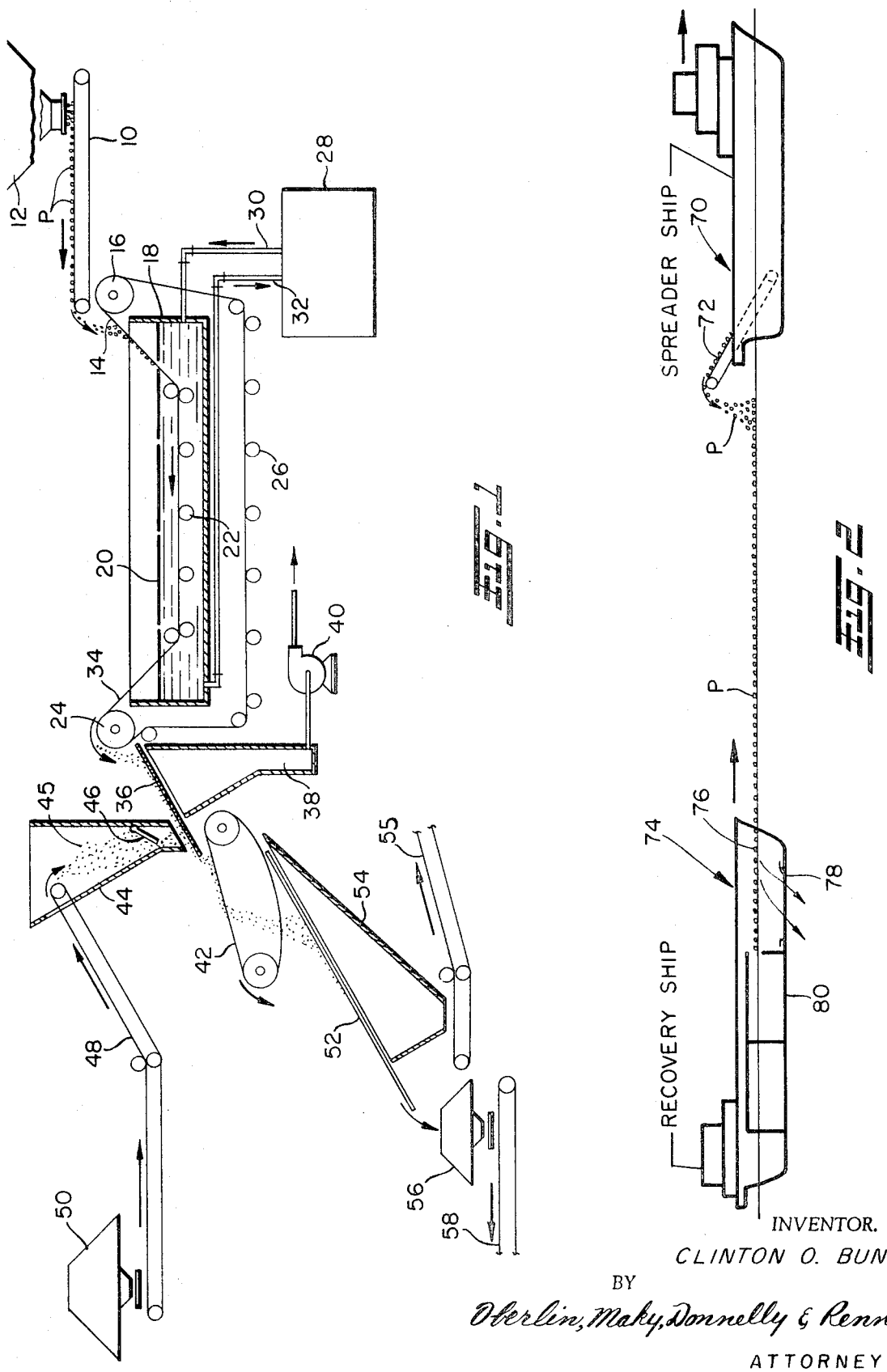

3,536,615
METHOD OF AND APPARATUS FOR TREATING OIL LEAKAGE
Clinton O. Bunn, Springfield, Va., assignor to Col-Mont Corporation, Butte, Mont., a corporation of Delaware
Filed Aug. 6, 1969, Ser. No. 848,039
Int. Cl. B01d 15/00, 17/02
U.S. Cl. 210—36                                   10 Claims

ABSTRACT OF THE DISCLOSURE

Oil leakage on the surface of bodies of water is treated by spreading over the surface of the water discrete particles coated with finely divided carbonaceous or the like material having a high affinity for oil. Oil is adsorbed on the surface of the particles, with the particles being thereafter collected for further treatment, for example, drying and agglomerating. The particles following such treatment consititute an economic fuel source immediately usable for fuel purposes.

BACKGROUND OF THE INVENTION

The present invention relates as indicated to a method of and apparatus for treating oil leakage.

The recovery or treatment of oil undesirably accumulating on the surface of open waters, such as rivers, oceans, harbors, ports and the like, has posed a persistent problem which has defied solution. This problem has been substantially magnified recently by the tremendous quantities of oil seeping to the surface of the water as a result of leaks in offshore oil operations. Such leakage in such great quantities is a serious concern for several reasons. The washing of the oil onto the shore not only damages the shore and shore installations, but may cause death to birds and wildlife on the shore. Secondly, the presence of oil on the water surface constitutes a distinct fire hazard. Further, the continued escape or leakage of oil to the surface of the water results in a continuing and substantial economic loss.

In view of the above, it is not surprising that numerous efforts of a varying nature have been made to solve the problem of oil leakage. A typical proposed solution is the provision of means to partially or completely surround the area of oil accumulation on the water and then to collect and pump such oil to a suitable storage area. Such purely mechanical recovery systems are difficult to establish and maintain owing to the normally large area of leakage and the constant wave action in such area.

It has also been proposed to use oil adsorbing materials, such as straw or vermiculite, with such materials being spread on the surface of the water where the oil leakage occurs and subsequently collected with the oil adsorbed on the surface thereof. Although this adsorption method has obvious advantages, a big drawback is the recovery of this material and the ultimate disposition thereof, with such material, when coated with oil, being essentially a waste product.

SUMMARY OF THE INVENTION

The primary object of the present invention is to provide a method of and apparatus for treating oil leakage wherein a material having a high affinity for oil is spread onto the surface of the water and subsequently recovered by skimmers or the like for removing the surface oil.

A further object of the present invention is to provide such a material and method wherein the composition of the material, including the oil adsorbed on the surface thereof, constitutes a convenient and economic fuel source.

In accordance with the invention, the recovered, oil-adsorbed float material is further processed, either adjacent to the operation, for example, in the recovery ship itself, or by an adjacent shore installation with such further treatment rendering the material immediately usable for fuel purposes.

Another object of the present invention is to provide such a method wherein various combinations of materials can be satisfactorily used to accomplish the intended purpose. As long as the adsorbing particles have the following four basic characteristics, the particular composition of one or more of the components is not critical. Initially, the particle must float on water for relatively long periods of time. Secondly, the surface of the particle must have a greater affinity for oil than for water. Third, the particle must be susceptible to recovery while retaining the adsorbed oil on the surface thereof, and fourth, the particle when saturated with adsorbed oil must possess the necessary fuel properties.

Within the above necessary characteristics, a relatively great variation of materials can be employed. In this manner, the availability of a particular material at the particular location of the leakage can be significantly taken into account, thereby realizing obvious economic advantages.

These and other objects of the invention will be apparent as the description proceeds in particular reference to the attached drawing, in which:

BRIEF DESCRIPTION OF THE DRAWINGS

FIG. 1 is a diagrammatic view of the preferred process of making the affinitive, coated particles; and FIG. 2 is a diagrammatic view of the preferred method of spreading the coated particles on the surface of the water, and the recovery of the oil-adsorbed particles from such surface for further treatment in accordance with the present invention.

DESCRIPTION OF THE PREFERRED EMBODIMENT

Before proceeding directly to a discription of the invention as assentially schematically shown in FIGS. 1 and 2 the invention will be described in general terms. The ultimate float product in accordance with one form of the invention has a core of natural or synthetic fibrous material, with each such core being thereafter coated on the surface thereof with a substance having both healing and adhesive qualities. The thus coated particles are then further coated with finely divided carbon material which preferably covers the entire surface of the particle and is adhesively secured thereto through the adhesive, sealant layer. The carbon coated particles are thereafter spread on the water surface in the area of the oil leakage, with the natural affinity of the oil for the carbon material resulting in adsorption of the oil on the carbon coated surfaces of the particles. Means are then provided for recovering from the water surface the oil-adsorbed particles for further treatment. The particles when recovered and dried are in condition for further treatment to facilitate use thereof as a fuel source. Such treatment might, for example, include agglomeration of the particles into generally briquette shaped masses, which step may or may not include the addition of a binder material.

In accordance with a further form of the invention, the float product comprises a foamed thermoplastic or thermosetting material which, with certain materials, inherently provides a surface to which the fine carbon particles can adhere without requiring prior application of an adhesive. The foamed materials can be used alone or in combination with other such materials, or with aliphatic or like materials, depending on availability and relative costs of such materials, and the combustion properties desired in the collected float product.

Referring now to the application drawing which illustrates the present invention in essentially diagrammatic form, and initially to FIG. 1, a feed conveyor 10 of conventional construction travels beneath a hopper 12 or like storage container for receiving the basic particles, designated P. The particles P can, as above noted, be rather widely variable as long as the above mentioned characteristics are present. Commonly available materials which can be satisfactorily used are sawdust, shavings, wood chips, bast, bark, cork and various other vegetable fibers which have the requisite characteristics. Although certainly not exhaustive, a list of such vegetable fibers includes cotton, flax, coir, abaca, hemp, henequen, jute, ramee, sisal, pina, kapok, alginate, lastex, rubber, paper papier maché, palm, peanut and other hulls, etc. Animal fibers and materials, including wool, mohair, hair, casein, silk, animal dung, hide, bones, horn, fat can also be used if necessary where availability permits consideration of such material. Foamed thermoplastic or thermosetting materials may also be used, as noted above and as will be described in more detail hereinbelow.

Hereinafter, the particles P will be referred to as wood chips, with the word "chip" being employed in its broadest sense to include shavings, sawdust, or wood particles of varying sizes and shapes. Although highly satisfactory results have been obtained wherein such wood chips form the basic particle, it will be understood that the following description is by way of example only, and that the other materials noted above may likewise be used dependent upon the local economic advantage of the available materials.

The wood chips P pass from the conveyor 10, which is conventional in construction and need not be described in detail, onto a moving, endless conveyor belt 14, one drive sprocket 16 for which is positioned generally below the discharge end of conveyor 10. The conveyor belt 14 is trained downwardly through the confines of a tank 18 containing an adhesive and sealant material 20. As shown diagrammatically in FIG. 1, the level of the material 20 in the tank 18 is preferably maintained so that conveyor 14 is essentially submerged to agitate and coat the wood chips while passing through the tank in the direction indicated by the arrow. Guide rollers 22 are positioned in the tank 18 transversely to vertically guide the belt 14, and sprocket 24 and bottom guide rolls 26 complete the closed conveyor loop system which agitates and coats the wood chips.

The fluid 20 is heated to the desired temperature to reduce viscosity by a heater 28 located exteriorly of the tank 18, and fluid lines 30 and 32, respectively, return the heated fluid to the tank 18 and deliver fluid from the tank 18 to be heated. The fluid 20 should possess two characteristics. One, it must function as the bonding agent or adhesive between the particle P and the final coating material which provides the necessary affinity for oil. Secondly, the fluid 20 serves as a sealant to prevent the float particles from becoming water laden, which condition is a significant impediment both to the flotation properties of the particles and to the subsequent processing of the oil-adsorbed particles for fuel purposes.

Although any fluid or fluids having the above noted characteristics may be used, the fluid is preferably selected from natural resins such as shellac or resins which have suitable adhesive properties. Synthetic resins are also acceptable, with polyester resins and furan resins being exemplary. These resins may be used alone or compounded with other materials, or can be mixed if desired with tar sands to reduce costs and improve the combustion characteristics of the end product. Under some circumstances, asphalt or manufactured tars are satisfactory. The adhesive can be applied to the particles in the manner illustrated and above described or with a suitable hardener directed to the particles just prior to the coating of the same with fine carbon.

It will be understood that the material or materials employed will to a significant degree depend upon the availability and local economic advantage of the noted materials in the area concerned, and the material from which particles P are comprised. It will also be understood that two separate fluids could be provided to obtain the necessary sealing and adhesive properties with suitable hardening and curing agents as required.

The particles P after traversing submerged through the tank 18 are carried therefrom by the upper run 34 of the conveyor 14, with the coated chips descending into a drain screen 36 of a suitable mesh size to pass the fluid but retain the coated particles. The fluid passing through the screen 36 collects in sump 38 and is returned by pump 40 to the source of fluid supply for return to the system.

After traversing the screen 36, the coated particles descend onto the down run of an agitated endless, fine screen conveyor 42.

Disposed vertically immediately above the discharge end of the screen 36 is a hopper 44 which is adapted to contain finely divided carbon material which is adapted to be adsorbed on the surface of the coated particles passing down screen 36. A suitable gate valve 46 or the like can be provided interiorly of the hopper 44 for regulating the quantity of material discharged therefrom. The carbon material is fed to the hopper 44 by means of conveyor 48 on which the material is deposited from a storage bin shown diagrammatically at 50.

The quantity of carbon material discharged from the hopper 44 is in excess of that needed to completely coat the particles passing therebelow from the screen 36. The excess carbon particles pass downwardly through the screen 52 to a bin 54. The latter discharges material from the bottom thereof onto a moving conveyor 55 for suitable disposition of the excess carbon dust.

The carbon material 45 can be selected from any material having the necessary characteristics. The material must have a greater affinity for oil than for water, must be adhesively attached to the coated surface of the particles P so as to preferably completely coat the exterior thereof, and must possess when combined with the particles P, a sufficiently high B.T.U. rating to constitute an economically feasible fuel source. Crushed or ground coal are the preferred materials used, although carbon black, graphite, lignite, peat, charcoal, coal char, gilsonite and oil shale are satisfactory alternative material dependent upon local economic advantage.

The carbon coated particles traversing the conveyor 42 descend onto the fine screen conveyor 52 and travel downwardly thereover to a coated particle storage bin 56. A conveyor 58 travels below the bin 56 for receiving the coated particles for further handling.

In the invention thus far described, it will be seen that the core particles are coated with an adhesive and sealant and thereafter with an outer coating of carbon material, with the process being substantially continuous and automatic.

In lieu of using the materials above mentioned and coating the same with an adhesive and sealant, certain materials are available which do not require the separate application of adhesive and/or sealant. Foamed thermoplastic materials appear to be particularly useful for this purpose, with such materials including by way of example polyethylene and polystyrene. These possess the common characteristic of being low in density and commercially available at relatively low cost per unit volume. Of these, polyethylene is preferred. This material does not retard combustion, and provides when foamed and before cooling, a surface film having temporary adhesive properties, permitting carbon particles to adhere to such surface without requiring a separate adhesive. The recently developed continuous extrusion process by which closed-cell foamed polyethylene can be formed will permit the carbon to be bonded to the surface thereof during the foaming operation, with this process providing even greater economies.

In addition to thermoplastic materials, foamed thermosetting materials may in certain instances also be employed. Although some thermosetting materials do not in general possess the inherent combustion properties of certain thermoplastic materials, they constitute excellent float products and can be manufactured at relatively low cost. The relatively poor combustion properties of foamed thermosetting materials may be offset by the relatively superior heating quality of the adhesive, carbon and recovered oil so that the combination is a satisfactory fuel. Examples of thermosetting materials are urethanes, phenolics, and polyesters.

In addition to the above, the float particles can comprise various combinations of thermosetting and thermoplastic materials, taking into account the local supply of these materials, costs, characteristics, etc.

It may also in certain instances be desirable to employ thermosetting or thermoplastic materials in combination with aliphatic materials for the latter's combustion characteristics. Aliphatic materials would be employed which dissolve at acceptable rates in petroleum so as to maintain the integrity of the collected float particles until further processing of the same is effected. Although the use of aliphatic materials would increase somewhat the cost of the float material, as contrasted with the use of thermoplastic materials alone, this increased cost is offset by the greatly improved fuel characteristics of the collected, oil-adsorbed float product.

FIG. 2 illustrates one system of treating oil leakages in accordance with the present invention. A spreader ship generally indicated at 70 provides the carbon coated particles P with a conveyor 72 communicating with the storage or manufacturing area of the ship to the exterior thereof. In this manner, the particles P can be uniformly spread across an area generally coextensive with the width of the conveyor 72.

A recovery ship generally indicated at 74 trails the spreader ship 70 and is provided with skimmer means (not shown) or the like for skimming in the particles P from the surface of the water for further processing. The particles thus entering the recovery ship initially pass over a screen 76 through which the water passes to a discharge opening 78, with the coated particles being carried by the conveyor 76 to a suitable storage area in the ship, indicated at 80. Although the function of the recovery ship 74 may cease at this point, further processing equipment preferably is housed in the recovery ship for processing the individual coated particles to what is essentially a full product in consummable form. The recovery ship is thus preferably provided with a suitable drying oven through which the coated particles are passed for reducing the water content to the extent possible. The dried particles are then conveyed to a pressing facility where the individual particles are compacted into briquette shaped particles of predetermined size. If desired, a suitable binder material may be added just prior to the pressing operation to facilitate agglomeration of the particles. After briquetting, the particles are essentially in condition for immediate use as fuel and can be conveyed to a separate storage area in the recovery ship for discharge from the ship. Conveying means are preferably provided for discharging the fuel briquettes from the recovery ship either in port or to a separate vessel employed to transport the briquettes to a shore installation. If the latter arrangement is employed, it will be apparent that the recovery ship can operate essentially continuously at site with the spreading ship to eliminate the oil leakage.

It will thus be seen that the objects of the invention have been accomplished. The carbon coated particles P perform the important function of adsorbing the oil on the surface of the water, and when collected and processed, provide an inexpensive source of fuel. As above explained, the invention is susceptible to wide variations in terms of the materials employed, with the materials above mentioned being satisfactory but by no means exhaustive. The particular materials employed will vary widely from area to area, depending upon the materials available at the particular location.

What I claim as my invention is:
1. The method of removing oil leakage from the surface of a body of water, comprising the steps of:
   (1) providing discrete core particles of light weight material, said material being combustible and sufficiently light to float on water,
   (2) coating said particles with a fluid sealant and adhesive,
   (3) coating the sealed particles with a carbon-aceous material having a high affinity for oil,
   (4) spreading the thus coated particles on the surface of the water to absorb the oil,
   (5) collecting the oil-adsorbed particles from the surface of the water, and
   (6) treating the collected particles for rendering the same substantially immediately usable as a fuel source.
2. The method of claim 1 wherein said core particles are selected from a group consisting essentially of sawdust, shavings, wood chips, bast, bark, cork and vegetable and animal fibers.
3. The method of claim 1 wherein said fluid sealant and adhesive is selected from a group consisting essentially of natural resins including shellac, natural and manufactured tars from tar sands, wood, coal, oils, fats, and various wastes, thermosetting resins and thermoplastic resins.
4. The method of claim 1 wherein said carbonaceous material is selected from a group consisting essentially of carbon black, crushed or ground coal, graphite, lignite, peat, charcoal, coal char, gilsonite, and oil shale.
5. The method of claim 1 wherein the step of treating the collected particles comprises the steps of drying the oil-adsorbed particles, and agglomerating such particles into briquette-shaped bodies for further handling.
6. The method of removing oil leakage from the surface of a body of water, comprising the steps of
   (1) providing discrete core particles of a light weight plastic material, said material being combustible and sufficiently light to float on water,
   (2) coating such particles with a carbonaceous material having a high affinity for oil,
   (3) spreading the thus coated particles on the surface of the water to absorb the oil,
   (4) collecting the oil-adsorbed particles from the surface of the water, and
   (5) treating the collected particles for rendering the same substantially immediately usable as a fuel source.
7. The method of claim 6 wherein said plastic material is thermoplastic and selected from the group consisting essentially of foamed polyethylene and polystyrene.
8. The method of claim 7 wherein said thermoplastic material is foamed polyethylene.
9. The method of claim 6 wherein said foamed plastic material is thermosetting and selected from the group consisting essentially of urethanes, phenolics, and polyesters, and further including the step of coating said particles with a combustible adhesive before application of said carbonaceous material.
10. Apparatus for treating oil leakage collecting on the surface of a body of water, comprising:
   (1) means for applying to the surface of discrete, light weight particles a sealant and adhesive coating, said material being combustible and sufficiently light to float on water,
   (2) means for applying to such particles a further coating of carbonaceous material having a high affinity for oil,

(3) means for spreading the particles coated with such carbonaceous material on the surface of said water for adsorbing said oil,
(4) means for collecting the oil-absorbed particles, and
(5) means for treating the discrete, collected particles for rendering the same immediately usable as a fuel source.

References Cited

UNITED STATES PATENTS

| | | | |
|---|---|---|---|
| 1,056,800 | 3/1913 | Krause | 210—502 |
| 2,219,581 | 10/1940 | Schmidt | 210—36 X |
| 3,382,170 | 5/1968 | Pape | 210—40 X |
| 3,464,920 | 9/1969 | Pirson et al. | 210—36 X |

SAMIH N. ZAHARNA, Primary Examiner

U.S. Cl. X.R.

210—40, 502